United States Patent [19]
Batson et al.

[11] Patent Number: 5,778,428
[45] Date of Patent: Jul. 7, 1998

[54] PROGRAMMABLE HIGH PERFORMANCE MODE FOR MULTI-WAY ASSOCIATIVE CACHE/MEMORY DESIGNS

[75] Inventors: Kevin A. Batson, Williston; Robert A. Ross, Jr., Essex Junction, both of Vt.

[73] Assignee: International Business Machines Corporation, Armonk, N.Y.

[21] Appl. No.: 577,167

[22] Filed: Dec. 22, 1995

[51] Int. Cl.[6] ............................................. G06F 12/00
[52] U.S. Cl. ..................................... 711/128; 711/118
[58] Field of Search ................................. 395/445, 455; 365/196, 207, 49; 711/118, 128

[56] References Cited

U.S. PATENT DOCUMENTS

| | | | |
|---|---|---|---|
| 4,135,240 | 1/1979 | Ritchie | 395/491 |
| 4,669,064 | 5/1987 | Ishimoto | 365/189.05 |
| 4,930,067 | 5/1990 | Nakamura | 364/200 |
| 5,014,195 | 5/1991 | Farrell et al. | 364/200 |
| 5,025,366 | 6/1991 | Baror | |
| 5,148,396 | 9/1992 | Nakada | 365/189.03 |
| 5,185,878 | 2/1993 | Baror et al. | |
| 5,329,494 | 7/1994 | Suzuki et al. | 365/230.03 |
| 5,367,653 | 11/1994 | Coyle et al. | |
| 5,367,659 | 11/1994 | Iyengar et al. | |
| 5,400,285 | 3/1995 | Sakata | 365/205 |
| 5,418,756 | 5/1995 | McClure | |
| 5,426,755 | 6/1995 | Yokouchi et al. | |
| 5,550,774 | 8/1996 | Brauer et al. | 365/189.02 |
| 5,602,798 | 2/1997 | Sato et al. | 365/233 |

OTHER PUBLICATIONS

Patterson & Hennessy, "Computer Organization & Design: The Hardware/Software Interface", Morgan Kaufmann Publishers, Inc., p. B–30, Figure B.23, 1994.

Microsoft Press, "Computer Dictionary: The Comprehensive Standard for Business, School, Library, and Home", Microsoft Press, pp. 181–182, 1994.

Hennessy et al., "Computer Organization and Design: The Hardware/Software Interface", Morgan Kaufman Publishers, ISBN 1-55860-281-X, p. 509, 1994.

Primary Examiner—Tod R. Swann
Assistant Examiner—Felix B. Lee
Attorney, Agent, or Firm—Rockey, Milnamow & Katz, Ltd.

[57] ABSTRACT

The present invention provides circuitry which facilitates user selection of alternative memory accessing techniques. The present invention provides a design approach or technique to transform the time associated with waiting for a valid "way-select" signal into cycle reduction time, thus providing a beneficial increase in the overall performance of multi-way associative cache and memory designs.

17 Claims, 5 Drawing Sheets

PROGRAMMABLE HIGH PERFORMANCE MODE FOR MULTI-WAY ASSOCIATIVE CACHE/MEMORY DESIGNS

BACKGROUND OF THE INVENTION

The present invention relates to a memory access design which facilitates the programmable selection of the manner in which memory and cache access occurs, depending on speed and power considerations.

A set-associative cache memory permits the storage of two or more words in cache memory at the same index (cache) address. Thus, each cache memory word stores two or more words from main memory at the same cache address. The distinct data words stored in cache at the same index (cache) address are each associated with a tag. The number of tag/word pairs stored in one word of cache forms a "set". A set of size two has two tag/word pairs stored at each index (cache) address.

It is possible to have multiple cache memory words located at one index (cache) address. A cache memory which has multiple cache words at one cache address is referred to as a multi-way cache. Thus, if there were two cache words at each cache address, the cache would be a two way associative cache memory.

Multi-way associative memory designs use "ways" as an additional level of decode (in the bitline dimension) to translate data and information into and out of the memory array. Often, the way information is the last of the inputs to arrive during a memory read operation and thus may dictate the best case performance for a given memory design.

Multi-way associative caches/memories have two options for setting sense amps: set all sense amps early then apply late way select to the late select multiplexor (mux); or, wait for late select to arrive and set only the selected way sense amps. Unfortunately, providing for either one of these methods results in trade-offs in terms of desired speed and power requirements. The process of setting all sense amps early, then applying the way select as it is subsequently available is very fast, but requires much power since all sense amps are enabled. This is undesirable in situations in which it is desired to use as little power as possible, such as in laptop applications.

On the other hand, waiting for way select to arrive before setting selected sense amps uses less power but is inefficient in terms of memory access speed.

The prior art shows that circuit designs incorporate one access scheme or the other.

Providing a flexible design approach or technique which would allow the circuit designer to select, via programming, one or the other method of access would prove to be most useful. Transforming the wasted time associated with waiting for a valid "way select" into cycle time reduction is certainly beneficial in increasing the overall performance of multi-way associative cache and memory designs, but providing low power circuits is desirable in some situations, such as in laptop circuit design.

SUMMARY OF THE INVENTION

The present invention provides circuitry allowing a designer to select a memory access method depending on power and performance considerations.

The present invention provides for two modes of memory access operation, a high speed mode and a low power mode, allowing a single design to operate reliably across a wide range of process and application variations.

The present invention uses mode select logic to control the timing of the setting of sense amps. In a high performance mode, the mode select logic controls cache/memory access by sending a signal that sets all sense amps early, before a late arriving, way select signal is applied to a select mux. In low power mode, the sense amps are not set until a late, way select signal arrives, thus setting only selected way sense amps.

Further, the present invention provides mode selection circuitry which, after sufficient signal margin/bitline differential has developed across bitline pairs, provides for latching of the contents of all memory cells into all of their associated sense latches, before actual way selection has occurred. Thus, the time waiting for the way select signal, time otherwise wasted in previous designs, is utilized in the present invention to provide a selectable, high performance, high speed mode of operation. In addition, the present invention provides mode selection circuitry which provides for the latching of the contents of selected memory cells, thus providing a low power mode of operation.

The present invention provides a user selectable system which provides either a "high performance" mode of operation that utilizes the delay inherent in the generation of a valid "way select" to reduce the time required to successfully execute a "read" operation, or a low power mode of operation.

The subject invention includes: high performance mode select logic; read evaluate logic; dynamic restore logic; late select enable logic; sense amplifiers; and, a multiplexor.

The high performance mode select logic accepts as inputs: a high performance select signal with which a circuit designer or programmer can select high performance mode; an input which indicates when adequate signal margin is available for bitline sensing; and, a restore signal for resetting the circuitry. The mode select logic provides an input signal to the late select enable logic which enables the setting of sense amplifiers.

The dynamic restore logic accepts a restore signal as an input. The restore signal, generated at the beginning of each cycle to initialize or place the memory access circuitry into a known state, is also input to the high performance mode select logic and the read evaluate logic. The dynamic restore logic provides an input to the late select enable logic for effectively inhibiting memory reading.

The read evaluate logic accepts three inputs: a read signal; the restore signal mentioned previously; and, an inverted form of the restore signal. A proper read signal places the read evaluate logic in a condition to provide an input to the late select enable logic for enabling memory reading.

Thus, the late select enable logic accepts four inputs, one from each of the three above mentioned blocks, and a "way-select" signal. Depending on the values associated with each of these signals, the late select enable logic: outputs a signal which controls the sense amps for bitline sensing; and, outputs a signal which controls a multiplexor for outputting the values of selected sense amps.

BRIEF DESCRIPTION OF THE DRAWINGS

The novel features believed characteristic of this invention are set forth in the appended claims. The invention itself, however, as well as other objects and advantages thereof, may best be understood by reference to the following detailed descriptions, read in conjunction with the accompanying drawings in which:

DESCRIPTION OF THE PREFERRED EMBODIMENT

The present invention provides a user selectable system which provides either a "high performance" mode of operation that utilizes the delay inherent in the generation of a valid "way select" to reduce the time required to successfully execute a "read" operation, or a low power mode of operation.

Figure 1:
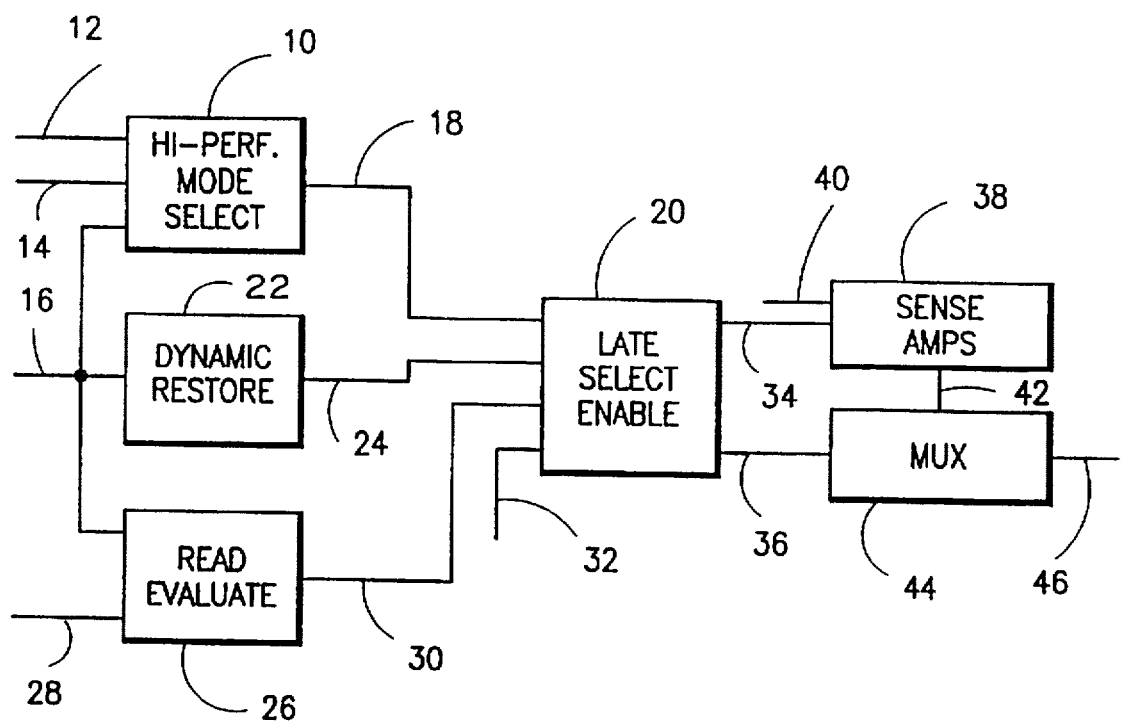
FIG. 1 is a block diagram of the overall circuitry of the present invention.

Referring to FIG. 1, which depicts an overall block diagram of the present invention, high performance mode select logic 10 accepts an input signal, SIGNAL_MARGIN, on signal line 12, an input signal, HIGH_PERF, on signal line 14 and an input signal RESTORE on signal line 16. The HIGH_PERF signal input provides a means by which a programmer or circuit designer can selectively enable the high performance mode of operation provided by the subject invention. The RESTORE signal will be described later.

Thus, with a properly enabled HIGH_PERF select signal, and with a proper SIGNAL_MARGIN signal, the select logic 10 outputs a SET_SENSE_AMP signal on signal line 18. The SET_SENSE_AMP signal serves as an input signal to the late select enable logic 20, and will, assuming other conditions are in the correct state, allow memory reading, as will be described later. The high performance mode select logic, in conjunction with additional circuitry, is the key component of the present invention.

Dynamic restore logic 22 accepts as an input, a RESTORE signal, on signal line 16. A RESTORE signal is generated at the beginning of each cycle to initialize or place the memory access circuitry into a known state. The restore logic generates an output signal, DYNAMIC_RESTORE, on signal line 24. This signal is provided as an input to the late select enable logic 20, and in the proper state, effectively inhibits memory reading, as will be described later. The RESTORE signal is also input to the high performance mode select logic and the read evaluate logic to place each of these circuits in a proper initial state.

Read evaluate logic 26 accepts as inputs, a READ signal on signal line 28, and the RESTORE signal mentioned previously, on line 16. A proper READ signal places the read evaluate logic in a condition to provide an output signal, READ_REQUEST_ACTIVE, on signal line 30. A proper READ_REQUEST_ACTIVE signal places the memory access circuitry in condition for reading memory. The READ_REQUEST_ACTIVE signal is provided as an input to the enable logic 20.

Thus, the late select enable logic 20 accepts as inputs: a SET_SENSE_AMP signal, line 18; a DYNAMIC_RESTORE, line 24; and, a READ_REQUEST_ACTIVE signal, on signal line 30. In addition, the late select enable logic accepts an additional input signal, WAY_SELECT, on signal line 32. The late select enable logic 20 outputs a SENSE_AMP_SET signal, on signal line 34 and a 4:1_MUX_SET signal on signal line 36, to be described later.

Sense amplifiers, indicated by 38, receive, as inputs, the SENSE_AMP_SET signal, on signal line 34, and a RESET_SENSE_AMP signal on signal line 40. The sense amplifiers, controlled by the SENSE_AMP_SET signal, sense the minute bitline signals output from the cache memory cells, supplying appropriate SENSE_AMP_OUT signals on signal line 42 to a multiplexor (mux) 44.

The mux 44 accepts as an input, the SENSE_AMP_OUT signals from the sense amp 38, and the 4:1_MUX_SET signal from the late select enable logic, on signal line 36. The multiplexor, controlled by the 4:1_MUX_SET signals provides an output signal 4:1-MUX_OUT via signal line 46.

Figure 2:
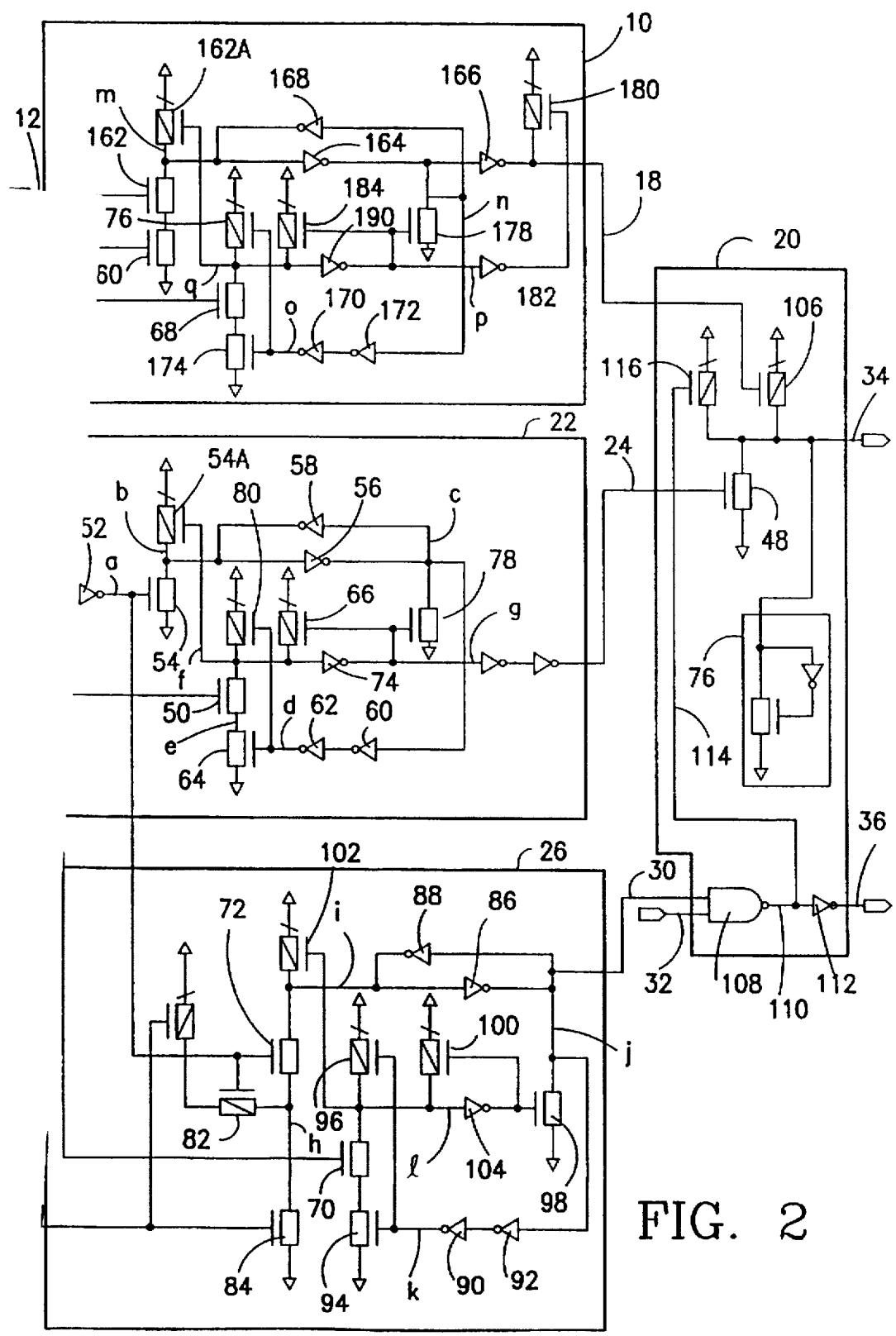
FIG. 2 is a circuit diagram of a portion of the present invention, including performance select logic, restore logic and read enable logic.

FIG. 2 is provided as a more detailed diagram illustrating various blocks of the present invention.

During normal operation the output on signal line 24 is maintained at a low level to ensure that transistor 48 is off.

Note also that the low value of the RESTORE signal on line 16 is seen by transistor 68 in the mode select logic, forcing this transistor off, and by transistor 70 in the read evaluate logic, holding this transistor off. With RESTORE signal on line 16 at a low level, transistor 50 is turned off. The low input signal is inverted by inverter 52, resulting in a high signal on node a, turning transistor 54 on and placing node b at ground potential. Inverter 56 causes a high signal level at node c. Node c's high is maintained by a latch formed by inverters 58 and 56. Node c's high results in a high at node d after passing through dual inverters 62 and 60. node d's high signal level turns on 64, forcing node e to ground.

Also, the inverted low signal at node a is seen by transistor 72 in the read evaluate logic, holding this transistor on.

Now, when RESTORE input is pulsed with a high level on signal line 16, to ensure that circuitry is in a known state, an immediate result is that 50 is turned on, placing node f at ground through transistor 64 which has been on from the previous quiescent state. With node f at a low level, node g is driven high due to inverter 74, turning off 66 disabling the half latch formed by inverter 74 and transistor 66. Signal line 24 is ultimately pulsed high, turning on transistor 48, forcing signal line 34 to ground. Note that half latch 76 holds signal line 34 low until a read is attempted.

Another immediate result of having the RESTORE input at a high level on line 16 is that node a, due to inverter 52, is driven to a low level, turning off 54. Node b which has been low from the previous quiescent state is held low by the latch formed by 58 and 56, while node a is at a low. With node f now at a low, node b is pulled high due to transistor 54A and node g is pulled high due to inverter 74. A high on node g turns on transistor 78, pulling node c to ground. A low at c propagates through inverters 62 and 60, turning off 64 and turning on 80. Node f is forced to a high signal level which in turn forces node g to a low, ultimately resulting in a low signal level on line 24, turning transistor 48 off. The low at g is maintained by the half latch formed by 74 and 66 ensuring that transistor 48 is off.

Assuming RESTORE is inactive, i.e. at a low signal level, transistor 70 is off, transistor 82 is off and transistor 72 is on. With READ input on signal line 28 at a high level, transistor 84 is turned on, placing node h at ground and placing node i at ground through transistor 72. Hence, READ_REQUEST_ACTIVE on signal line 30 is at a high level due to inverter 86. A latch formed from inverters 88 and 86 maintains the last READ_REQUEST_ACTIVE signal generated.

With node j at a high signal level, node k is at a high level via inverters 90 and 92, turning on transistor 94. Transistor 96 is held off. In addition, from a previous quiescent state to be discussed later, transistor 98 is off, 100 is on and therefore node 1 is at a high signal level, holding transistor 102 off.

When RESTORE is pulsed high, transistor 72 is turned off and transistor 70 is turned on. Since 94 was on from the previous state, node 1 is dropped to ground potential through 70 and 94, turning on transistor 102 and forcing node i to a high signal level. Also, transistor 98 is turned on from the high resulting from inverter 104, dropping node j, and hence, READ_REQUEST_ACTIVE to ground. Node k ultimately goes low via inverters 90 and 92, turning off transistor 94 and turning on 96.

With transistor 96 turned on , turning off 102, turning off 98 through inverter 104 and turning on transistor 100. With READ at a high signal level, and RESTORE back to its normal low level, the circuit returns to the previous state.

Assume, for the time being, that high performance mode is disabled, i.e. the HIGH_PERF signal on line 14 is at a low value, SET_SENSE_AMP on line 18 is at a high value, ensuring that transistor 106 is off, and hence, the high performance circuit does not affect the reading of memory.

With HIGH_PERF disabled and READ active, normal reading of memory occurs only as soon as a high WAY_SELECT signal on line 32 is provided. This signal will result from additional memory decode circuits which are not shown, but are known to those with skill in art. When the inputs to NAND gate 108 are both at a high level, a low LATE_SELECT_ENABLE signal is output from the NAND gate on line 110. Inverter 112 inverts this signal to provide a high 4:1_MUX_SET signal on line 36. In addition, the low output from the NAND gate 108 is supplied on signal line 114 to turn on transistor 116. This places a high signal level on line 34.

Figure 3:
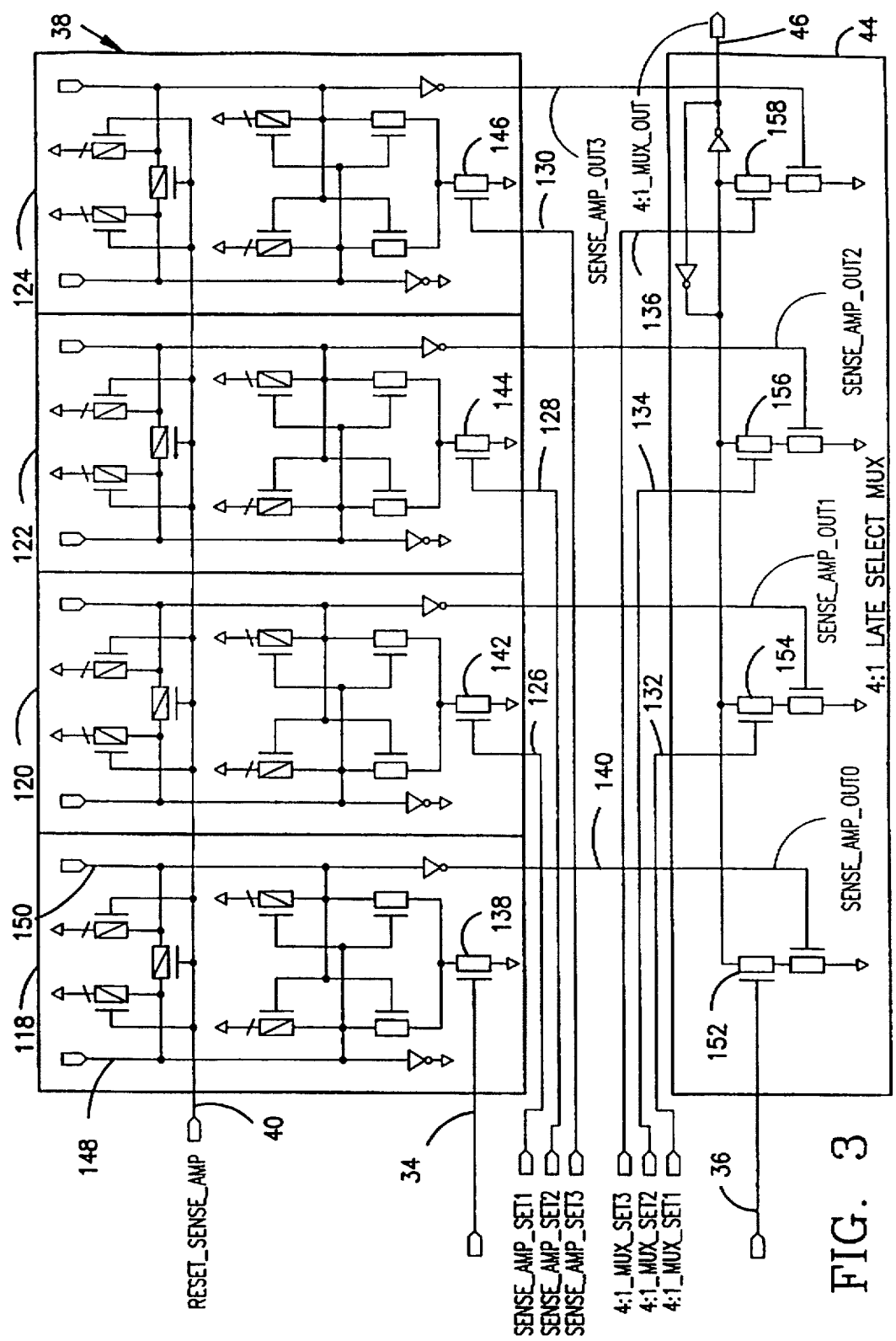
FIG. 3 is another circuit diagram of another portion of the present invention, depicting sense amplifiers and a multiplexor; and, FIGS. 4-6 graphically depict signal levels associated with the present invention.

Turning to FIG. 3, sense amplifier block 38 includes a number of sense amplifiers 118, 120 122 and 124. It should be noted that the present invention will function with any number of sense amplifiers, four such amplifiers provided as a representative number. Also, additional SENSE_AMP_SET signal lines 126, 128 and 130 are provided, as well as additional 4:1_MUX_SET signals 132, 134 and 136. These additional signals come from additional late select enable logic circuits, not illustrated.

With the SENSE_AMP_SET signal on line 34 at a high level, transistor 138 is turned on, completing the sense latch connection to ground, allowing the bitline offset to be sensed, transformed and stored within the latch as a logical "one" or "zero" depending on the contents of the memory cells, not shown. The contents of memory is output from the sense amplifier via signal line 140, SENSE_AMP_OUT. Note that transistors 142, 144, and 146 can be similarly turned on by their associated SENSE_AMP_SET signals. The actual operation of the sense amplifiers, including their functioning with regard to bitlines 148 and 150 is conventional, and will not be described.

At nearly the same time, the 4:1_MUX_SELECT signal on line 36 is provided to the late select mux 44. This signal, at a high level, turns on transistor 152, providing the memory contents to output signal line 46, 4:1_MUX_OUT. Again, note that the additional signal 4:1_MUX_SET signal lines can turn on their corresponding transistors 154, 156 and 158.

The above described mode of operation is conventional and such memory accessing is known by those skilled in the art. This mode of operation is most useful when power considerations are of prime importance. Through the use of a novel combination of inventive circuitry with known circuit elements, the present invention provides a means to selectively operate in a different, faster mode of operation.

Turning our attention back to FIG. 2, we will consider the operation of the high performance mode select logic 10.

Again, assuming that the memory access circuitry has been restored, if it is desired to operate in a high performance mode the circuit designer only need ensure that a high signal, HIGH_PERF is place on signal line 14. This signal will turn on transistor 160. In addition, an active high SIGNAL_MARGIN signal on line 12 will turn on transistor 162. The SIGNAL_MARGIN signal is generated by additional circuitry not shown, and occurs after sufficient signal margin/bitline differential has been developed across the bitline pairs associated with a memory cell. As is known in the art, a sufficient level of charge must be evident on the bitlines output from a memory cell, before a reliable differential determination can be made by sense amplifiers. There are a variety of ways to determine whether enough bitline offset has developed to provide sufficient SIGNAL_MARGIN to reliably swing the sense amplifier, none of which is disclosed herein, as these techniques are well known to those with skill in the art.

Thus with transistors 160 and 162 turned on, node m is at ground potential. Inverters 164 and 166 ultimately generate a low value on signal line 18, SET_SENSE_AMP. This signal turns on transistor 106, placing a high signal level on signal line 34, thus turning on transistor 138 (FIG. 3), allowing bitline sensing and latching of the contents of the memory cell into the sense amp.

Thus, with node m at ground, node n is at a high level due to inverter 164. A latch formed by inverters 168 and 164 holds node n at the last selected signal level. Ultimately node o is at a high level due to inverters 170 and 172, turning on transistor 174 and holding transistor 176 off.

In addition, from the previous quiescent state, transistor 178 is off, node p is at a low signal level and transistor 180 is off via inverter 182. Also 184 is on, forcing node q to a high signal level.

Shortly after the SIGNAL_MARGIN signal on line 12 pulses high, turning on transistor 162, forcing node m to ground potential, it is pulsed low based on internally self-time logic delay, not shown. Again, this is a technique known to those in the prior art.

When RESTORE is pulsed high, transistor 68 is turned on, dropping node q to ground via 68 and 174, which is on from the previous state. With node q low, transistor 162A is turned on, forcing node m to a high signal level. Also, transistor 178 is turned on from the high resulting from inverter 190, dropping node n to ground and ultimately resulting in SET_SENSE_AMP having a high signal level. Also, transistor 180 gets turned on, also forcing SET _SENSE_AMP high. The low level on node n results in a low signal level at node o, turning on transistor 176 and forcing node q back to a high level, returning the circuit to its previous state.

It is important to note that when operating in the high performance mode, it is not necessary that valid READ and WAY_SELECT signal be in place before setting the sense amps. In the case of normal operation as described previous, the sense amps were enabled only after valid READ and valid WAY_SELECT signals were supplied to the circuitry to turn on transistor 116. In the case of high performance operation, the sense amps have been placed in condition for reading through the use of a HIGH_PERF signal to turn on transistor 106.

While awaiting a valid WAY_SELECT input, time otherwise wasted in previous designs is utilized here in "high performance" mode: sensing the bitlines; latching the contents of memory into sense latches; isolating/redriving the sense latch outputs; and, validating the data path input into the late select mux circuitry that follows.

Similar to the normal mode of operation, once a valid WAY_SELECT signal finally arrives, via signal line 32, and a READ_REQUEST_ACTIVE signal arrives via signal line 30, both the 4:1_MUX_SET output and the SENSE_AMP_SET outputs are determined, as shown in FIG. 3.

Figure 4:
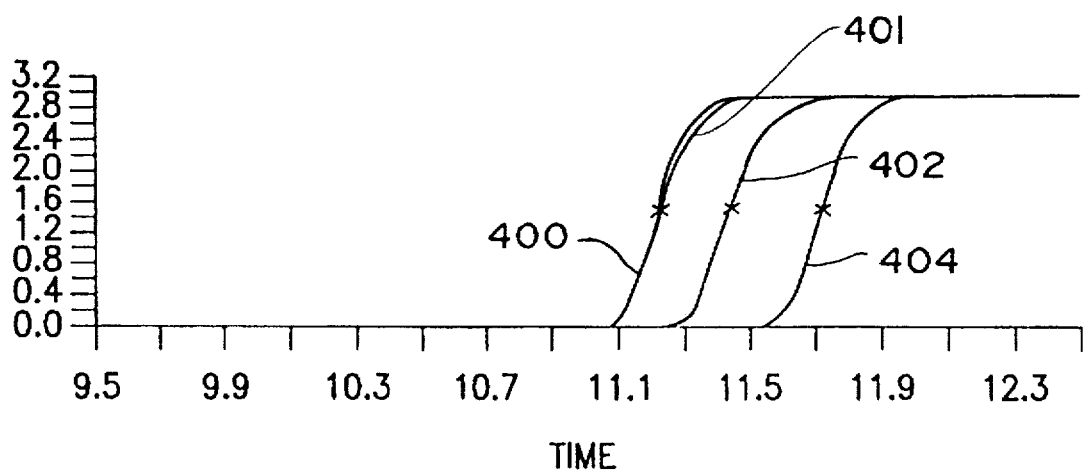

FIG. 4 quantifies the delay from an active 4:1_MUX_SET to a valid 4:1_MUX_OUT for normal modes of operation. 400 and 401 depict the signal levels of SENSE_AMP_SET and 4:1_MUX_SET on signal lines 34 and 36, respectively, of FIGS. 1–3. 402 depicts the signal level of SENSE_AMP_OUT signal line 140. 404 depicts the signal level of 4:1_MUX_OUT on signal line 46. At 1.5 volts, indicated by "*", the delay measured is 4:1 MUX_OUT-4:1_MUX_SET, or 497 picoseconds.

Figure 5:
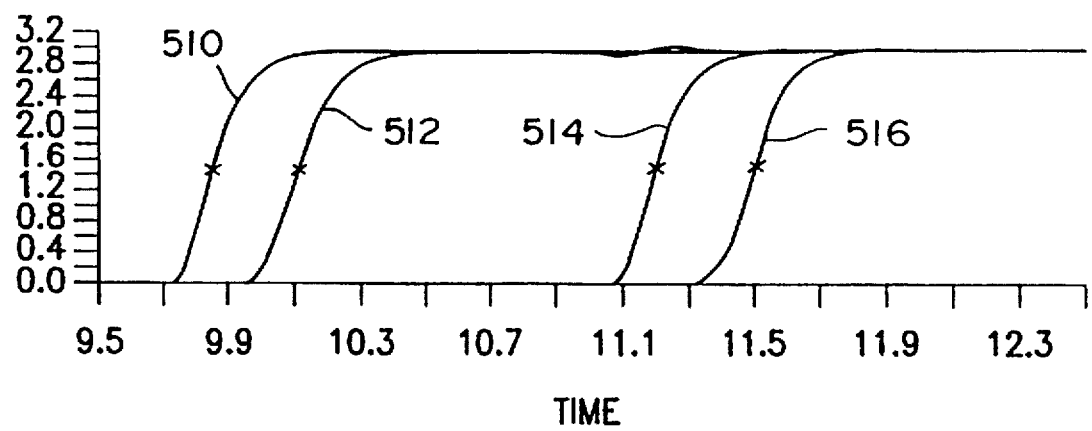

In FIG. 5, various signal levels of the present invention, with high performance mode invoked, are depicted. 510 indicates the signal level of SENSE_AMP_SET on signal line 34; 512 indicates the signal level of SENSE_AMP_OUT on signal 140; 514 indicates the signal level of 4:1_MUX_SET on signal line 36; and, 516 indicates the signal level of 4:1_MUX_OUT on signal line 46. With the high performance feature invoked, i.e. the HIGH_PERF signal on line 14 is active, the delay measured from 4:1_MUX_SET to 4:1_MUX_OUT, at the 50% point indicated by "*", measured 294 picoseconds, a decrease of 200+ picoseconds for the same operating conditions. This 200 ps improvement in the "read" operation translates into cycle time reduction and an overall increase in performance.

Figure 6:
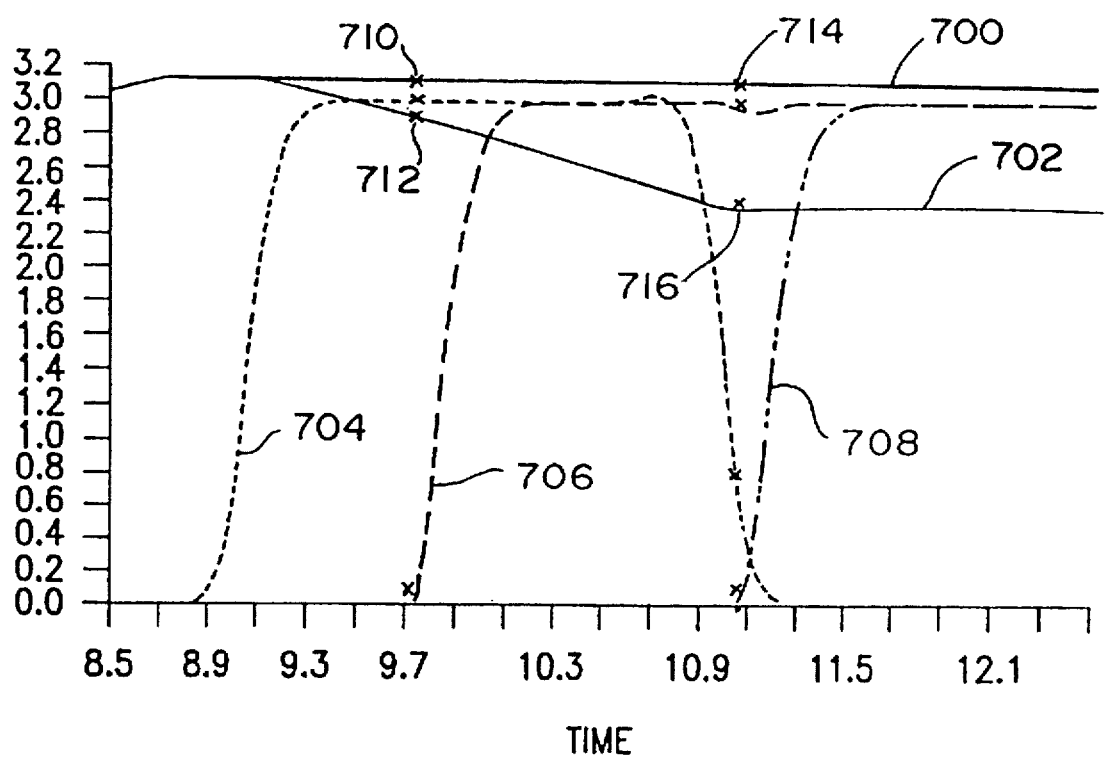

Another advantage of this design can be seen in FIG. 6, where 700 indicates the signal level on the complimentary bitline; 702 indicates the signal level on the true bitline; 704 indicates the signal level on the wordlines; 706 indicates the signal level on SENSE_AMP_SET in high performance mode; and 708 indicates the signal level on SENSE_AMP_SET in low power mode. Signal margin ranges from 218 mV, the point 712 minus the point 710, (minimum requirement set by this design) in high performance mode, to 721 mV, point 716 minus point 714, (maximum allowable offset for this design) in normal operating mode. The advantage of offering two modes of operation is that a single design can be made to operate reliable across a wide range of manufacturing process conditions, both anticipated and unexpected. In the event device parasitics and process induced noise sensitivity dictates more signal margin than originally modelled, this design affords the flexibility of compensating signal margin to track process variations.

It is important to note that the two modes of operation differ in overall power consumption as well. In "high performance" mode, all sense latches are initially set/latched to recover the 200+ picoseconds in performance discussed above. In this scenario, four times as many sense latches are activated and bitlines discharged than in normal, low power mode. This increase in device activity directly relates to increased power.

What is claimed is:

1. A method for accessing the memory cells of a memory device comprising:

providing sensing devices for detecting the contents of the memory cells of the memory device;

enabling one sensing device in a first mode of operation to detect one memory cell associated with the enabled sensing device; and, enabling a plurality of the sensing devices in a second mode of operation to detect the contents of the memory cells associated with the plurality of the sensing devices and selecting the output of one of the plurality of the sensing devices.

2. The method of claim 1 further comprising the step of selecting between said first and second modes of operation.

3. The method of claim 2 further comprising the step of enabling said second mode of operation in response to first and second signals.

4. The method of claim 3 further comprising the step of indicating a proper condition for determining the contents of the memory cells by providing said first signal, providing said second signal as a selectable signal for enabling memory accessing.

5. The method of claim 1 wherein the sensing devices comprise at least one sense amplifier.

6. The method of claim 1 wherein the at least one sensing device enabled in the first mode of operation is selected in response to a way signal.

7. The method of claim 1 wherein the memory device comprises cache memory.

8. A memory accessing system comprising:

a plurality of memory cells having bit lines whose differential signals are indicative of the contents of the cells;

sensing devices to detect the bit line differential signals of the memory cells and to output the contents of the memory cells; and, circuitry to operate the memory system in a first mode wherein the sensing devices detect one of the memory cells and a second mode wherein the sensing devices detect a plurality of memory cells and the contents of one of the plurality of the memory cells is selected.

9. The memory accessing system of claim 8 wherein the circuitry is activated in response to user programming.

10. The memory accessing system of claim 8 further comprising logic coupled to the circuitry to selectively enable the first and second modes.

11. The memory accessing system of claim 8 wherein the sensing devices comprise at least one sense amplifier.

12. A memory device having memory cells comprising:

sensing devices to detect the contents of the memory cells, one the of sensing devices being enabled in a first mode of operation, and a plurality of the sensing devices being enabled in a second mode of operation; and selecting circuitry to select the output of the one sensing device in the first mode of operation and to select one of the outputs of the plurality of sensing devices in the second mode of operation.

13. The device of claim 12 further comprising mode selection circuitry to selectively enable one of the first and second modes.

14. The device of claim 13 wherein the mode selection circuitry includes a half latch coupled to at least one of the sensing devices.

15. The device of claim 12 wherein the plurality of sensing devices are enabled before the arrival of a way signal in the second mode of operation.

16. The device of claim 12 wherein the first mode of operation is enabled when a way signal is provided to the enabling circuitry.

17. The device of claim 12 wherein the selecting circuitry comprises a multiplexor.

* * * * *